H. B. SMITH.

CULTIVATOR.

No. 7,377. Reissued Oct. 31, 1876.

WITNESSES

Wm A Stinkle

F. Stich

INVENTOR

Hoel B Smith.

By his Attorney

Wm D. Baldwin

UNITED STATES PATENT OFFICE.

HOEL B. SMITH, OF BUCK HEAD, GA., ASSIGNOR TO STEPHEN A. GOODWIN AND DAVID J. POWERS, OF CHICAGO, AND RALPH EMERSON AND WILLIAM A. TALCOTT, OF ROCKFORD, ILL.

IMPROVEMENT IN CULTIVATORS.

Specification forming part of Letters Patent No. 39,760, dated September 1, 1863; reissue No. 7,377, dated October 31, 1876; application filed June 6, 1876.

*To all whom it may concern:*

Be it known that I, HOEL B. SMITH, formerly of Eureka, in the county of Woodford and State of Illinois, but now residing at Buck Head, in the county of Morgan and State of Georgia, have invented certain new and useful Improvements in Wheel-Cultivators, of which the following is a specification:

The object of my invention is to secure a strong, light, and simple machine, in the use of which the operator may have an open central space, affording an unobstructed view of the plants to be cultivated as far in advance of their being reached by the plows as it is practicable to do so, and thus be enabled readily to move the plows, as may be required, to avoid injury to the plants which may happen not to stand true in the rows, as is very often the case.

The subject-matter claimed will hereinafter specifically be designated.

Figure 1:
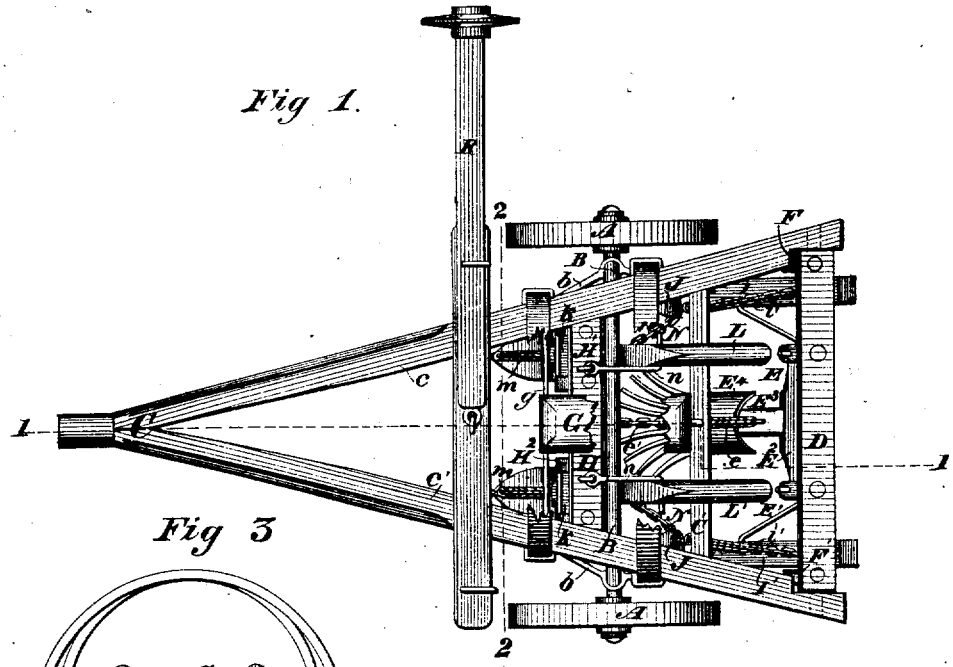
Figure 3:
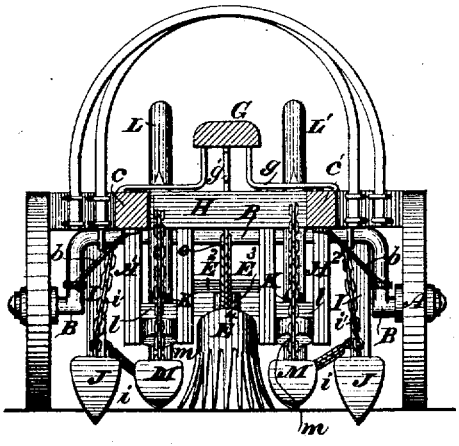
Figure 2:
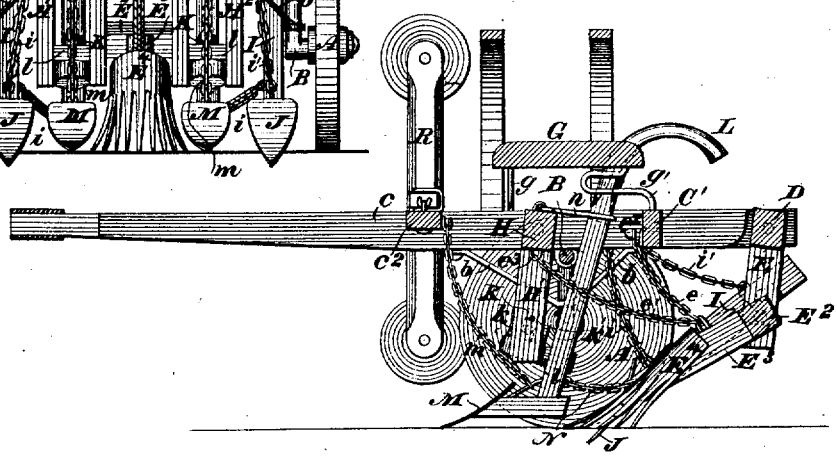

In the accompanying drawings, Figure 1 represents a plan or top view of my improved cultivator; Fig. 2, a vertical longitudinal central section therethrough on the line 1 1 of Fig. 1; and Fig. 3 a vertical transverse section therethrough on the line 2 2 of Fig. 1, looking backward.

Two wheels, A A′, are mounted upon an axle, B, arched or bent upward so as to pass freely over the growing plants. The lower or crank portions of this axle are connected by braces *b* with the side bars *c* $c^1$ of a V-shaped draft-frame, C, which rests upon the axle, the side bars being connected together at their front ends and diverging backward. A cross-bar, $C^1$, connects these diverging side bars or frame-timbers. By this method of construction I secure a strong frame with the smallest practicable amount of material. The view of the operator is not obstructed, as would be the case with a rectangular frame, or one provided with longitudinal pieces obstructing the central space between the parts of the diverging frame, which also prevent the horses from treading on the rows of plants being cultivated.

A shaft, D, rocks freely in bearings in the rear ends of the cross-bars *c* $c^1$. Pendants or down-hangers E $E^1$ F F′ project from this rock-shaft. A short shaft, $E^2$, turning in bearings in the central pendants E $E^1$, carries a bar or standard, $E^3$, to which a toothed share, $E^4$, of rake form is secured. This share may be raised or lowered so as to penetrate a greater or less depth into the earth, as desired, by adjusting a chain, *e*, one end of which is connected with the bar or standard $E^3$, and the other or opposite end to the cross-bar C′ of the frame. Another chain, $e^1$, also may be attached at one end to the bar or standard $E^3$, while its opposite end is secured to a transverse rock-shaft, H, on the frame, which will be hereinafter more fully described. The chains are adjusted by merely taking them up or letting them out from their respective hooks $e^2$ $e^3$ on the main frame. An operator's seat, G, is supported at its front end upon an arched cross-bar, *g*, and at its rear end upon a curved rod, *g*′, connected with the cross-bar C′. Legs or standards I I, respectively pivoted to their outer pendants F F′, carry shovels or plows J on their lower ends, as usual, which plows may be adjusted to regulate their depth of penetration into the earth by chains *i i*′, similar to those above described for adjusting the toothed share.

The plows, as well as the toothed share, are adjustable independently of each other, each being connected with a separate shaft turning freely in its bearings, and both the plows and toothed share may be raised simultaneously by rocking the shaft D in its bearings, and retained in their elevated position by means of the chains above described, which also serve to limit the backward movement of the plows or shares when working. The transverse rock-shaft H, above mentioned, is pivoted in the side bars, and carries two pairs of pendants or down-hangers, $H^1$ $H^2$. A shaft, *k*, rocks in bearings in each pair of these pendants. A swiveled rod, K, passes transversely through each of these shafts, and is prevented from dropping by a transverse pin, *k*′, which allows the rod to turn freely. These rods are provided with hubs *l* at their lower ends, to which curved bars or handles L L′ are secured by means of pivots or bolts *l*′, which permit of a lateral swinging movement of the handles, which also have a backward and forward oscillation on their shafts *k*. Plows M, of the usual shovel form, are secured to the lower ends of the handles, and the handles themselves are retained in proper position, or prevented from turning casually too far backward, by means of chains *m*, which connect the handles with a transverse bar, $c^2$, on the frame. This arrangement of the handles admits of their plows being moved laterally or adjusted forward and backward, as desired, and in plowing crops in hills or drills all the plows may be adjusted relatively with regard to the plants, as the nature of the work may require, and the weeds between the rows be thus thoroughly eradicated.

In plowing corn or other crops, the back plows may be lifted above the surface of the ground by taking up their respective chains, or all the plows may be allowed to penetrate into the earth, if desired, and this may be necessary in many cases for the perfect eradication of weeds and the pulverizing of the soil. But it is necessary to elevate the back plows as well as the front ones in turning at the ends of rows, so that all the plows may be above the surface of the ground, and this is done by bearing down on the upper ends of the handles L. This result is accomplished by connecting the rear plows with the handles by means of chains N, and when the device is again ready for operation the handles are elevated to nearly a vertical position, and the plows descend to their proper position in the earth. The handles are supported and braced near their outer ends by links *n* connecting them with the rock-shaft H, which causes both to rock together. In digging potatoes the back plows are elevated and the rake-shares and front plows lowered, the machine being drawn along so that the rake-share will work in line with the rows, and a plow at each side thereof. I mount the frame on wheels, thereby relieving the plows from its weight, and rendering it easier to adjust them laterally while the machine is working.

In furrowing, I design to use a marker, R, of well-known construction, which it is unnecessary here to describe in detail.

I do not broadly claim a V-shaped draft-frame or split tongue, as that is old; neither do I broadly claim a cultivator-frame mounted upon wheels, as both of these devices, separately considered, are old; but I am not aware of the existence, in a cultivator mounted on wheels prior to my invention, of an open skeleton draft-frame or tongue diverging from a point in advance of the wheels to leave an unobstructed central opening, through which the plants may be seen previous to being approached by the plows.

I claim as of my own invention—

1. The combination, substantially as hereinbefore set forth, of the wheels, the open skeleton draft-frame, and the plows capable of lateral oscillation with respect to the path of the wheels while the machine is operating.

2. The combination, substantially as hereinbefore set forth, of the wheels, the open skeleton draft-frame, the plows capable of lateral oscillation with respect to the path of the wheels while the machine is operating, and a seat in rear of the open space, whereby the operator has an opportunity to observe and readily adapt the plows to the irregularities of the plants in the rows.

3. The combination, substantially as hereinbefore set forth, of the wheels, the open skeleton-frame, and the laterally-adjustable plows suspended therefrom.

HOEL B. SMITH.

Witnesses:
I. M. FEW,
S. W. BOOTH.